United States Patent [11] 3,624,015

[72] Inventors James R. Vaughn;
 Mary V. Durkin, both of Greensboro, N.C.
[21] Appl. No. 814,799
[22] Filed Apr. 9, 1969
[45] Patented Nov. 30, 1971
[73] Assignee Dow Corning Corporation
 Midland, Mich.

[54] FINISH/POLISH FOR WHITE LEATHER
 8 Claims, No Drawings
[52] U.S. Cl. .................................................. 260/28.5 R,
 117/64, 260/29.6 T, 260/827
[51] Int. Cl. ..................................................... C08c 11/70,
 C08f 45/52
[50] Field of Search ............................................ 117/64;
 260/827, 29.6 T, 28.5

[56] References Cited
 UNITED STATES PATENTS
2,511,695 6/1950 Canfield .................... 260/29.6 T
3,048,496 8/1962 Buechler et al. ............ 260/29.6 T
3,203,919 8/1965 Brachman ................... 260/29.6 R
3,294,725 12/1966 Findlay et al. .............. 260/29.2 M
3,429,842 2/1969 Wolstoncroft ............... 260/28.5
 FOREIGN PATENTS
1,491,782 7/1967 France Primary Examiner—Morris Liebman
Assistant Examiner—Samuel L. Fox
Attorneys—Robert F. Fleming, Jr., Laurence R. Hobey and Harry D. Dingman ABSTRACT: A finish/polish for white leather is disclosed which is an aqueous emulsion consisting essentially of (1) 5 to 15 percent by weight of a silicone-acrylate graft copolymer which consists essentially of 20 to 50 percent by weight of a silicone which consists essentially of 88 to 97 mol. percent of dimethylsiloxane units and 3 to 12 mol. percent of methylvinylsiloxane units, and 50 to 80 percent by weight of an acrylate which consists essentially of 58 to 62 percent by weight of ethyl acrylate, 32 to 40 percent by weight of methylmethacrylate and 2 to 6 percent by weight of a compound selected from the group consisting of methacrylic acid, acrylic acid and acrylonitrile, (2) 0.1 to 1.5 percent by weight of a leveling agent, (3) 2 to 4.5 percent by weight of ethylene glycol or a glycol ether, (4) 10 to 20 percent by weight of titanium dioxide, (5) 0 to 10 percent by weight of a wax, and (6) the balance water. The finish/polish can also contain as an optional ingredient from 1 to 3 percent by weight of a siloxane copolymer which consists essentially of 20 to 40 mol. percent of trimethylsiloxane units and 60 to 80 mol. percent of monomethylsiloxane units. The finish/polish of this invention does not tend to rub off and is, therefore, longer lasting, is essentially self-shining needing little or no buffing and provides a smooth finish with little or no evidence of powder or streaking.

FINISH/POLISH FOR WHITE LEATHER

SPECIFICATION

This invention relates to a finish/polish for white leather.

The major problem with existing white shoe polishes is that they are not durable enough. The polish rubs off and is easily scuffed. Other problems with the presently available white shoe polishes is that they easily crack as a result of polish buildup or drying of the leather caused by the polish itself and/or the cleanings between applications. Moreover, the present white shoe polishes are inadequate in their ability to cover scuff marks.

Other disadvantages of the presently available white shoe polishes are that they give a poor gloss, turn yellow with buffing, are streaked upon application, they don't leave an even finish and they are messy to apply.

It is an object of this invention to provide a finish/polish which overcomes the above problems which exist with the currently available white shoe polishes.

It has now been discovered that the disadvantages of the existing polishes can be overcome and the objects of this invention achieved by the use as a finish/polish for white leather a composition which is an aqueous emulsion consisting essentially of (1) 5 to 15 percent by weight of a silicone-acrylate copolymer which consists essentially of 20 to 50 percent by weight of a silicone which consists essentially of 88 to 97 mol percent of dimethylsiloxane units and 3 to 12 mol percent of methylvinylsiloxane units, and 50 to 80 percent by weight of an acrylate which consists essentially of 58 to 62 percent by weight of ethyl acrylate, 32 to 40 percent by weight of methylmethacrylate and 2 to 6 percent by weight of a material selected from the group consisting of methacrylic acid, acrylic acid and acrylonitrile, (2) 0.1 to 1.5 percent by weight of a leveling agent, (3) 2 to 4.5 percent by weight of ethylene glycol or a glycol ether, (4) 10 to 20 percent by weight of titanium dioxide, (5) 0 to 10 percent by weight of a wax, and (6) the balance water. In addition, in some instances it has been found that the objects of this invention can more readily be achieved when there is included in the above finish/polish from 1 to 3 percent by weight of a siloxane copolymer which consists essentially of 20 to 40 mol percent of trimethylsiloxane units and 60 to 80 mol percent of monomethylsiloxane units.

As indicated above, one essential ingredient of the finish/polish of this invention is 5 to 15 percent, preferably 8 to 12 percent, by weight of a silicone-acrylate copolymer. The silicone portion of this copolymer constitutes 20 to 50 percent, preferably 25 to 35 percent, by weight of a silicone which is composed of 88 to 97, preferably 92 to 97 mol percent of dimethylsiloxane units and from 3 to 12, preferably 3 to 8, mol percent of methylvinylsiloxane units. The remaining 50 to 80 percent, preferably 65 to 75 percent, by weight of the silicone-acrylate copolymer is composed of the acrylate portion. This acrylate portion is made up of from 58 to 62 percent by weight of ethyl acrylate, 32 to 40 percent by weight of methylmethacrylate and 2 to 6 percent by weight of a material selected from the group consisting of methacrylic acid, acrylic acid and acrylonitrile. Preferably, this latter material is methacrylic acid.

In order to achieve the objects and advantages of the present invention, the silicone-acrylate copolymer employed must be prepared by emulsion polymerization. Suitable emulsion polymerization processes for preparing these copolymers are set forth in French Patent No. 1,491,782, the disclosure of which is incorporated herein by reference. Essentially, in the preferred embodiment, the process of preparing the copolymer involves the polymerization of the siloxane portion in emulsion first, then subsequently adding thereto the appropriate acrylate monomers and copolymerizing the silicone and acrylate portions in emulsion. Alternatively, the silicone and acrylate monomers can be emulsified together and then the silicone monomers polymerized first and then subsequently adding a catalyst and causing polymerization of the resulting siloxane and the acrylate monomers to form the desired copolymer.

The second essential ingredient in the above finish/polish formulation is 0.1 to 1.5, preferably 0.5 to 1.2, percent by weight of a leveling agent. Leveling agents improve the wetting of hydrophobic surfaces, promote flow, decrease beading, ridges or thin spots during application of the finish/polish, and/or aids in the prevention of coagulation of solids or gellation of the finish/polish. Such materials are well known in the art and hence no useful purpose would be served here in repeating already available detailed lists of suitable materials. By way of illustration, tributoxyethylphosphate is a commercially available material which has been found to be particularly suitable in the instant formulations.

The third essential ingredient in the finish/polish formulation of this invention is 2 to 4.5, preferably 2.5 to 3.5 percent by weight of ethylene glycol or a glycol ether. These materials impart freeze-thaw stability to the formulation and aid in the coalescence of the finish/polish after it is applied to the white leather. Of these materials, the ethylene glycol is the preferred material to be employed at this time.

The fourth essential ingredient of the finish/polish of this invention is 10 to 20, preferably 10 to 15, percent by weight of titanium dioxide. This component functions as a pigment in the formulation and is preferably added as an emulsion or dispersion as are the leveling agent and wax.

While a wax is not an essential component of the formulation, it is desirable to have a wax present since it does contribute to a better polish. Generally speaking, the amount of wax employed will be in the range from 0 to 10 percent by weight. When a wax is employed it is usually preferred to include at least 1 percent by weight. The useful waxes in the finish/polish formulations of this invention include, for example, both natural and synthetic waxes, such as, high molecular weight polyoxyalkylene glycols, beeswax, carnauba wax, ozokerite, microcrystalline hydrocarbon waxes, chlorinated paraffin waxes, petroleum waxes, aliphatic hydrocarbon waxes prepared by the Fischer-Tropsch process, hydrogenated castor oil, myristic acid, palm wax, polyolefin waxes, polyacrylate waxes, acrylates, styrene copolymeric waxes and the like. Of these materials the carnauba wax is the preferred material at this present time.

The balance of the formulation is water which makes up the vehicle for the overall composition and is essential, of course, to the formation of the aqueous emulsion. While ordinary tap water can be used, if any reasonable degree of stability is desired in the emulsion formulation it is necessary that either deionized or distilled water be employed.

Another optional ingredient that can be included advantageously in the finish/polish compositions of this invention is a siloxane copolymer which consists essentially of 20 to 40 mol percent of trimethylsiloxane units and 60 to 80 mol percent of monomethylsiloxane units. This copolymer must be prepared by emulsion polymerization processes such as those described in U.S. Pat. Nos. 2,891,920; 3,294,725; and 3,360,491. The amount of this copolymer employed should be in the range of 1 to 3 percent by weight. The addition of this copolymer not only appears to plasticize the polymer film, and in some instances increase its tack but is most advantageously employed for the increase of gloss and smoothness which it imparts to the final finish.

The finish/polish formulations of this invention can, or course, contain other optional ingredients which are conventional in such formulations. For example, there may be included wetting, emulsifying and dispersing agents, stabilizers for the emulsion, pigments, perfumes, and, of course, propellants if the formulation is to be used in the form of an aerosol spray. Of course, any such optional ingredients will necessarily be selected so as to preserve the stability of the aqueous emulsion and so that no deleterious affect is had upon the finish of the white leather upon application of the formulation.

Now, in order that those skilled in the art may better understand how the present invention can be practiced the following examples are given by way of illustration and not by way of limitation. All percents referred to herein are by weight unless otherwise specified.

EXAMPLE 1

This example illustrates the preparation of a suitable silicone-acrylate copolymer to be employed in the composition of this invention. 32.99 percent of octamethyltetracyclosiloxane, 2.01 percent of methylvinyltetracyclosiloxane, 1 percent of dodecylbenzene sulfonic acid, 0.5 percent of the sodium salt of dodecylbenzene sulfonic acid and 63.5 percent of water were homogenized and placed in a three-necked flask equipped with a stirrer, condenser and separatory funnel. The flask was purged with nitrogen and then the mixture heated at about 90° C. for about a half an hour resulting in the emulsion polymerization of the two cyclic siloxanes to give a copolymer composed of about 95 mol percent dimethylsiloxane units and about 5 mol percent methylvinylsiloxane units. 213.1 grams of the resulting siloxane emulsion, 224.8 g. of water and 17.6 g. of a 1 percent solution of ammonium persulfate solution were then placed in another three-necked flask equipped as above, purged with nitrogen for about a half an hour and then a mixture of 104.4 g. of ethylacrylate, 5.1 g. of methacrylic acid and 64.5 g. of methylmethacrylate was added to the flask via the separatory funnel over a period of about 70 minutes maintaining the reaction mixture at about 70° C. Upon completion of the addition of the acrylate, the flask contents were heated at 90° C. for about a half an hour and then heating stopped and the pH of the mixture adjusted to about 8 with ammonium hydroxide. The resulting product was an aqueous emulsion of a silicone-acrylate copolymer which consists of about 30 percent of the silicone, about 70 percent of an acrylate, the acrylate portion being composed of about 60 percent ethyl acrylate, 2.9 percent methacrylic acid and 37.1 percent methyl-meth-acrylate.

EXAMPLE 2

This example illustrates the preparation of a siloxane copolymer composed of trimethylsiloxane units and monomethylsiloxane units which can be used as an optional ingredient. A mixture of 696.8 g. of the deionized water and 2 g. of dodecylbenzene sulfonic acid were placed in a three-necked flask equipped with stirrer, condenser and separatory funnel. A mixture of 81.2 g. of methyltrimethoxysilane and 20 g. of hexamethyldisiloxane were placed in a separatory funnel and added to the flask at room temperature over a period of about 2 hours. After the addition was complete, the mixture was stirred for an additional 16 hours and then neutralized with ammonium hydroxide. The result is an emulsion containing a siloxane copolymer which consists of about 33 mol percent trimethylsiloxane units and about 67 mol percent monomethylsiloxane units.

EXAMPLE 3

Four acrylic white shoe finish/polishes were tested against Johnson's White Shoe Polish under simulated use conditions at 1, 2 and 3 coat levels. All of the formulations prepared contained 3 g. of ethylene glycol, 6 g. of tributoxyethylphosphate (Primal Leveler MA-65), 3 g. of wax (Primal Binder C-6), 27 g. of a 50 percent titanium dioxide dispersion (Primal White 1687), about 10 percent polymer solids and the balance water. Formulation (1) contained a commercial acrylate polymer (AC-34) as the film-forming material. Formulation (2) contained the silicone-acrylate copolymer prepared as in example 1. Formulation (3) contained the silicone-acrylate copolymer prepared in example 1 and additionally about 2 percent of the siloxane copolymer prepared in example 2. Formulation (4) contained an acrylate copolymer composed of about 60 percent ethyl acrylate, 2.9 percent methacrylic acid and 37.1 percent methylmethacrylate, i.e., this polymer was similar to that of formulation (2) only without the silicone. Formulations (1) and (4) along with the Johnson's polish are included for purposes of comparison.

The testing of the above formulations was divided into series, each using a set of fina and calf leather. Wool dobbers were used for the finish applications. The objective of Series A was to obtain data on gloss, general appearance and water resistance data from the Dow Corning leather tester. Prior to treatment, all the leather for Series A was conditioned 16 hours in a constant temperature room. All leather samples were from the same hide including the controls. Coatings were applied 16 to 24 hours apart and allowed to dry in the constant temperature room. 72 hours after the final coat, the samples were run on the Dow Corning leather tester according to ASTM-D-2098-62-T procedure. The conditions were as follows:

Series A-1 —preflexed 500 flexes, 1 coat of finish and wet flexed,
Series A-2 —preflexed 500 flexes, 2 coats of finish and wet flexed,
Series A-3 —preflexed 500 flexes, 3 coats of finish, dry flexed 500 flexes, then wet flexed 3500 flexes,
Series A-4 —3 coats of finish and wet flexed.

The series B tests were to evaluate covering power. In this test scuffs were made with a spatula, 1, 2 and 3 deep. A ballpoint pen mark was put on the leather. Each coats covering power was then evaluated. The gloss was measured on the Gardner portable 60° Glossmeter.

The Series D tests were to evaluate the crock resistance of the finishes. In this test a piece of green felt was rubbed with pressure over the leather. Evaluation was based on the amount of pickup on the felt. Also resistance to household chemicals was measured. Each material was exposed to the samples 5 minutes, removed with toweling and evaluated. Chemicals used in this evaluation were 50 percent ethanol in water, 3 percent acetic acid solution, 1 percent Ivory flake solution, a 50—50 mustard-catsup mixture, a 1:1:1 mixture of coke, coffee and 5 percent citric acid, and an oil stain. Results of these series of evaluations are set forth in the tables below.

| Treatment | Leather | Sample | Series A-1 | | | Series B | | | General appearance |
|---|---|---|---|---|---|---|---|---|---|
| | | | Percent H₂O absorption | Flexes to penetration | Percent solids pick-up | Gloss Initial | Gloss One coat | Gloss After flex | |
| Control (none) | Fina | A | 36.5 | 715 | | | | | |
| | | B | 41.3 | 13 | | | | | |
| | | C | 36.7 | 823 | | | | | |
| | | D | 38.8 | 585 | | | | | |
| Johnson's white shoe polish | do | A | 53.1 | 249 | 0.4 | 6 | 21 | 11 | Streaked-uneven. |
| | | B | 30.9 | 338 | 0.4 | 6 | 22 | 10 | Do. |
| | | C | 50.1 | 78 | 0.5 | 6 | 26 | 13 | Do. |
| Formulation: | | | | | | | | | |
| (1) | do | A | 33.4 | 838 | 0.76 | 6 | 22 | 13 | Good finish. |
| | | B | 38.2 | 232 | 1.2 | 6 | 22 | 15 | Do. |
| | | C | 38.3 | 464 | 0.86 | 6 | 21 | 14 | Do. |
| (2) | do | A | 52.6 | 66 | 1.3 | 6 | 20 | 11 | Do. |
| | | B | 46.3 | 299 | 0.9 | 6 | 22 | 12 | Do. |
| | | C | 29.0 | 286 | 1.2 | 5 | 25 | 12 | Do. |

|  |  |  | Series A-1 | | | Series B | | | |
|---|---|---|---|---|---|---|---|---|---|
|  |  |  |  |  |  |  | Gloss | | |
| Treatment | Leather | Sample | Percent H₂O absorption | Flexes to penetration | Percent solids pick-up | Initial | One coat | After flex | General appearance |
| (3) | do | A | 34.5 | 352 | 2.1 | 6 | 20 | 14 | Dull finish. |
|  |  | B | 33.4 | 369 | 1.5 | 8 | 23 | 13 | Good finish. |
|  |  | C | 36.2 | 308 | 1.1 | 6 | 22 | 15 | Do. |
| (4) | do | A | 44.4 | 319 | 1.7 | 6 | 21 | 14 | Do. |
|  |  | B | 37.4 | 210 | 1.3 | 6 | 20 | 11 | Do. |
|  |  | C | 35.4 | 546 | 1.6 | 6 | 21 | 13 | Do. |
| Control (none) | Calf | A | 37.1 | 96 |  |  |  |  |  |
|  |  | B | 42.7 | 185 |  |  |  |  |  |
|  |  | C | 40.3 | 57 |  |  |  |  |  |
|  |  | D | 55.9 | 66 |  |  |  |  |  |
| Johnson's white shoe polish | do | A | 42.9 | 90 | 0.7 | 5 | 10 | 4 | Streaked-uneven. |
|  |  | B | 49.0 | 78 | 1.1 | 5 | 9 | 3 | Do. |
|  |  | C | 28.6 | 69 | 0.8 | 5 | 11 | 3 | Do. |
| Formulation: |  |  |  |  |  |  |  |  |  |
| (1) | do | A | 65.5 | 231 | 0.81 | 5 | 10 | 5 | Good finish. |
|  |  | B | 34.4 | 79 | 3.6 | 5 | 9 | 5 | Do. |
|  |  | C | 17.0 | 321 | 2.3 | 6 | 11 | 5 | Do. |
| (2) | do | A | 30.4 | 252 | 4.0 | 6 | 11 | 6 | Uneven due to leather surface. |
|  |  | B | 26.6 | 70 | 3.8 | 5 | 12 | 5 | Do. |
|  |  | C | 65.3 | 79 | 4.6 | 6 | 10 | 4 | Do. |
| (3) | do | A | 21.9 | 187 | 3.0 | 6 | 15 | 5 | Good finish. |
|  |  | B | 72.3 | 54 | 3.3 | 5 | 12 | 6 | Do. |
|  |  | C | 61.9 | 393 | 3.7 | 6 | 15 | 4 | Do. |
| (4) | do | A | 15.1 | 200 | 3.8 | 6 | 12 | 6 | Do. |
|  |  | B | 31.1 | 115 | 3.3 | 5 | 11 | 4 | Do. |
|  |  | C | 35.6 | 94 | 2.0 | 6 | 12 | 8 | Do. |

|  |  |  | Series A-2 | | | Series B | | | | |
|---|---|---|---|---|---|---|---|---|---|---|
|  |  |  |  |  |  |  | Gloss | | | |
| Treatment | Leather | Sample | Percent H₂O absorption | Flexes to penetration | Percent solids pick-up | Initial | One coat | Two coats | After flex | General appearance |
| Control (none) | Fina | A | 36.5 | 715 |  |  |  |  |  |  |
|  |  | B | 41.3 | 13 |  |  |  |  |  |  |
|  |  | C | 36.7 | 823 |  |  |  |  |  |  |
|  |  | D | 38.8 | 585 |  |  |  |  |  |  |
| Johnson's white shoe polish | do | A | 34.1 | 432 | 1.0 | 6 | 29 | 32 | 11 | Streaked-uneven. |
|  |  | B | 45.7 | 196 | 1.5 | 7 | 36 | 34 | 5 | Do. |
|  |  | C | 36.4 | 291 | 1.2 | 6 | 34 | 37 | 5 | Do. |
| Formulation: |  |  |  |  |  |  |  |  |  |  |
| (1) | do | A | 33.1 | 536 | 0.62 | 6 | 24 | 28 | 16 | Good finish. |
|  |  | B | 61.1 | 428 | 2.0 | 6 | 20 | 24 | 14 | Do. |
|  |  | C | 31.8 | 571 | 0.46 | 6 | 21 | 26 | 14 | Do. |
| (2) | do | A | 37.4 | 667 | 1.9 | 6 | 21 | 29 | 10 | Do. |
|  |  | B | 59.2 | 10 | 2.2 | 7 | 19 | 26 | 15 | Do. |
|  |  | C | 36.9 | 453 | 1.8 | 6 | 19 | 25 | 13 | Do. |
| (3) | do | A | 30.1 | 442 | 2.6 | 6 | 24 | 33 | 14 | Do. |
|  |  | B | 63.0 | 354 | 2.2 | 9 | 32 | 36 | 15 | Do. |
|  |  | C | 33.4 | 294 | 1.9 | 7 | 28 | 34 | 14 | Do. |
| (4) | do | A | 31.9 | 397 | 2.4 | 6 | 20 | 28 | 18 | Do. |
|  |  | B | 34.3 | 387 | 2.0 | 6 | 19 | 24 | 11 | Do. |
|  |  | C | 32.3 | 429 | 1.6 | 6 | 20 | 26 | 13 | Do. |
| Control (none) | Calf | A | 37.1 | 96 |  |  |  |  |  |  |
|  |  | B | 42.7 | 185 |  |  |  |  |  |  |
|  |  | C | 40.3 | 57 |  |  |  |  |  |  |
|  |  | D | 55.9 | 66 |  |  |  |  |  |  |
| Johnson's white shoe polish | do | A | 25.3 | 182 | 4.4 | 6 | 13 | 20 | 3 | Streaked-uneven. |
|  |  | B | 57.6 | 75 | 2.9 | 6 | 10 | 16 | 5 | Do. |
|  |  | C | 48.6 | 43 | 0.8 | 5 | 11 | 14 | 4 | Do. |
| Formulation: |  |  |  |  |  |  |  |  |  |  |
| (1) | do | A | 28.6 | 415 | 6.1 | 6 | 11 | 18 | 6 | Good finish. |
|  |  | B | 50.6 | 432 | 5.8 | 5 | 10 | 15 | 7 | Do. |
|  |  | C | 55.0 | 755 | 4.7 | 6 | 12 | 14 | 6 | Do. |
| (2) | do | A | 31.5 | 413 | 6.2 | 5 | 10 | 17 | 5 | Uneven due to leather surface. |
|  |  | B | 26.5 | 569 | 7.8 | 6 | 11 | 16 | 7 | Do. |
|  |  | C | 29.6 | 452 | 7.7 | 7 | 13 | 21 | 5 | Do. |
| (3) | do | A | 20.4 | 671 | 6.5 | 6 | 12 | 19 | 6 | Good finish. |
|  |  | B | 20.9 | 376 | 8.4 | 6 | 11 | 23 | 8 | Do. |
|  |  | C | 66.4 | 1,088 | 7.5 | 6 | 14 | 22 | 5 | Do. |
| (4) | do | A | 30.8 | 160 | 2.6 | 5 | 10 | 13 | 8 | Do. |
|  |  | B | 20.7 | 566 | 7.0 | 6 | 10 | 16 | 5 | Uneven due to leather surface. |
|  |  | C | 26.8 | 382 | 4.6 | 5 | 9 | 12 | 6 | Do. |

|  |  |  | Series A-3 | | | Series B | | | | | |
|---|---|---|---|---|---|---|---|---|---|---|---|
|  |  |  |  |  |  |  | Gloss | | | | |
| Treatment | Leather | Sample | Percent H₂O absorption | Flexes to penetration | Percent solids pick-up | Initial | One coat | Two coats | Three coats | After flex | General appearance |
| Control (none) | Fina | A | 36.5 | 715 |  |  |  |  |  |  |  |
|  |  | B | 41.3 | 13 |  |  |  |  |  |  |  |
|  |  | C | 36.7 | 823 |  |  |  |  |  |  |  |
|  |  | D | 38.8 | 585 |  |  |  |  |  |  |  |
| Johnson's white shoe polish | do | A | 46.1 | 62 | 1.4 | 6 | 30 | 38 | 35 | 11 | Streaked. |
|  |  | B | 37.2 | 399 | 1.3 | 7 | 28 | 40 | 38 | 8 | Do. |
|  |  | C | 30.5 | 522 | 1.5 | 6 | 34 | 36 | 44 | 10 | Do. |
| Formulation: |  |  |  |  |  |  |  |  |  |  |  |
| (1) | do | A | 48.3 | 189 | 3.3 | 6 | 23 | 35 | 35 | 12 | Good finish. |
|  |  | B | 57.1 | 134 | 1.9 | 7 | 21 | 25 | 31 | 15 | Do. |
|  |  | C | 37.4 | 38 | 2.1 | 7 | 22 | 29 | 30 | 14 | Do. |
| (2) | do | A | 23.2 | 419 | 2.8 | 6 | 22 | 26 | 28 | 12 | Do. |
|  |  | B | 32.9 | 284 | 2.8 | 6 | 22 | 25 | 31 | 18 | Do. |
|  |  | C | 38.8 | 47 | 1.0 | 9 | 20 | 31 | 36 | 14 | Do. |
| (3) | do | A | 47.5 | 90 | 3.1 | 6 | 25 | 30 | 33 | 15 | Do. |
|  |  | B | 46.3 | 104 | 3.0 | 7 | 30 | 36 | 39 | 20 | Do. |
|  |  | C | 65.0 | 130 | 2.7 | 7 | 23 | 31 | 42 | 21 | Do. |
| (4) | do | A | 17.5 | 1,815 | 3.0 | 6 | 21 | 30 | 31 | 16 | Do. |
|  |  | B | 28.9 | 635 | 1.7 | 6 | 21 | 30 | 29 | 20 | Do. |
|  |  | C | 36.4 | 354 | 2.0 | 6 | 22 | 30 | 33 | 18 | Do. |

| Treatment | Leather | Sample | Series A-3 | | | Series B | | | | | General appearance |
|---|---|---|---|---|---|---|---|---|---|---|---|
| | | | Percent H₂O absorption | Flexes to penetration | Percent solids pick-up | Gloss | | | | | |
| | | | | | | Initial | One coat | Two coats | Three coats | After flex | |
| Control (none) | Calf | A | 37.1 | 96 | | | | | | | |
| | | B | 42.7 | 185 | | | | | | | |
| | | C | 40.3 | 57 | | | | | | | |
| | | D | 55.9 | 66 | | | | | | | |
| Johnson's white shoe polish | do | A | 49.9 | 39 | 5.2 | 7 | 15 | 20 | 22 | 2 | Streaked. |
| | | B | 49.4 | 59 | 4.8 | 6 | 14 | 19 | 27 | 3 | Do. |
| | | C | 64.7 | 76 | 7.5 | 7 | 14 | 20 | 26 | 3 | Do. |
| Formulation: | | | | | | | | | | | |
| (1) | do | A | 36.2 | 343 | 9.8 | 7 | 15 | 23 | 29 | 11 | Good finish. |
| | | B | 25.6 | 199 | 5.9 | 6 | 12 | 18 | 25 | 10 | Do. |
| | | C | 38.0 | 22 | 5.9 | 6 | 15 | 21 | 29 | 10 | Do. |
| (2) | do | A | 33.9 | 21 | 11.4 | 6 | 14 | 23 | 28 | 12 | Do. |
| | | B | 19.7 | 79 | 9.9 | 5 | 11 | 18 | 23 | 6 | Do. |
| | | C | 54.1 | 600 | 6.3 | 7 | 12 | 18 | 22 | 8 | Do. |
| (3) | do | A | 17.6 | 767 | 7.4 | 6 | 15 | 21 | 27 | 10 | Do. |
| | | B | 33.7 | 57 | 8.4 | 6 | 15 | 22 | 23 | 12 | Uneven due to leather surface |
| | | C | 74.0 | 215 | 6.3 | 6 | 9 | 21 | 24 | 8 | Do. |
| (4) | do | A | 38.8 | 35 | 9.2 | 5 | 9 | 17 | 20 | 5 | Do. |
| | | B | 40.4 | 28 | 7.1 | 6 | 9 | 12 | 16 | 7 | Do. |
| | | C | 41.0 | 30 | 6.9 | 5 | 9 | 13 | 14 | 5 | Do. |

| Treatment | Leather | Sample | Series A-4 | | | Series B | | | | | General appearance |
|---|---|---|---|---|---|---|---|---|---|---|---|
| | | | Percent H₂O absorption | Flexes to penetration | Percent solids pick-up | Gloss | | | | | |
| | | | | | | Initial | One coat | Two coats | Three coats | After flex | |
| Control (none) | Fina | A | 36.5 | 715 | | | | | | | |
| | | B | 41.3 | 13 | | | | | | | |
| | | C | 36.7 | 823 | | | | | | | |
| | | D | 38.8 | 585 | | | | | | | |
| Johnson's white shoe polish | do | A | 59.2 | 49 | 1.6 | 8 | 28 | 37 | 30 | 7 | Streaked. |
| | | B | 60.1 | 125 | 0 | 8 | 32 | 43 | 39 | 5 | Do. |
| | | C | 55.7 | 236 | 1.5 | 7 | 30 | 36 | 40 | 8 | Do. |
| Formulation: | | | | | | | | | | | |
| (1) | do | A | 68.0 | 121 | 2.4 | 5 | 23 | 29 | 33 | 22 | Good finish. |
| | | B | 45.4 | 933 | 1.9 | 6 | 24 | 32 | 34 | 20 | Do. |
| | | C | 41.0 | 886 | 2.4 | 6 | 21 | 30 | 31 | 20 | Do. |
| (2) | do | A | 46.4 | 593 | 2.8 | 6 | 22 | 24 | 28 | 21 | Do. |
| | | B | 46.3 | 304 | 2.0 | 7 | 20 | 25 | 33 | 19 | Do. |
| | | C | 63.4 | 255 | 2.4 | 7 | 21 | 23 | 26 | 16 | Do. |
| (3) | do | A | 61.4 | 359 | 4.1 | 7 | 30 | 24 | 47 | 18 | Do. |
| | | B | 63.8 | 216 | 3.4 | 6 | 28 | 33 | 42 | 16 | Do. |
| | | C | 34.0 | 402 | 3.4 | 6 | 27 | 35 | 38 | 20 | Do. |
| (4) | do | A | 24.8 | 697 | 3.4 | 8 | 23 | 29 | 31 | 17 | Do. |
| | | B | 22.3 | 1,100 | 2.4 | 7 | 24 | 32 | 32 | 18 | Do. |
| | | C | 31.1 | 621 | 2.2 | 6 | 20 | 26 | 27 | 14 | Do. |
| Control (none) | Calf | A | 37.1 | 96 | | | | | | | |
| | | B | 42.7 | 185 | | | | | | | |
| | | C | 40.3 | 57 | | | | | | | |
| | | D | 55.9 | 66 | | | | | | | |
| Johnson's white shoe polish | do | A | 37.1 | 105 | 5.5 | 7 | 13 | 21 | 26 | 3 | Streaked. |
| | | B | 62.2 | 48 | 4.8 | 6 | 12 | 20 | 22 | 3 | Do. |
| | | C | 57.7 | 27 | 4.8 | 6 | 10 | 15 | 23 | 2 | Do. |
| Formulation: | | | | | | | | | | | |
| (1) | do | A | 54.8 | 1,419 | 9.9 | 8 | 16 | 21 | 23 | 8 | Good finish. |
| | | B | 83.0 | 184 | 3.3 | 7 | 14 | 18 | 22 | 9 | Do. |
| | | C | 29.5 | 260 | 5.1 | 7 | 11 | 19 | 21 | 10 | Do. |
| (2) | do | A | 34.6 | 690 | 8.7 | 6 | 14 | 23 | 29 | 13 | Do. |
| | | B | 27.3 | 617 | 5.4 | 6 | 12 | 20 | 23 | 8 | Do. |
| | | C | 64.5 | 651 | 9.3 | 6 | 13 | 23 | 28 | 10 | Do. |
| (3) | do | A | 14.9 | 182 | 10.0 | 6 | 14 | 27 | 35 | 17 | Do. |
| | | B | 16.2 | 1,000 | 8.6 | 6 | 13 | 23 | 33 | 12 | Do. |
| | | C | 13.1 | 1,276 | 8.9 | 7 | 15 | 22 | 35 | 8 | Do. |
| (4) | do | A | 34.0 | 932 | 8.9 | 5 | 9 | 18 | 19 | 7 | Do. |
| | | B | 28.6 | 697 | 6.0 | 6 | 12 | 19 | 23 | 9 | Do. |
| | | C | 66.6 | 569 | 7.5 | 6 | 13 | 20 | 22 | 8 | Do. |

SERIES D-1.—ONE COAT OF FINISH-FILM AGED TWO DAYS

| Treatment | Leather | Crock resistance | Ethanol solution | Acetic acid solution | Detergent solution | Mustard and ketchup | Coke, coffee citric acid | Oil stain |
|---|---|---|---|---|---|---|---|---|
| Control (none) | Fina | | No effect | No effect | No effect | No effect | No effect | No effect. |
| Johnson's white shoe polish | do | Poor | Reduced gloss left circle | do | Remove polish | Stained | Stained | Removed polish. |
| Formulation: | | | | | | | | |
| (1) | do | Very good | Little effect | do | No effect | do | No effect | No effect. |
| (2) | do | Good | do | do | Removed polish | do | do | Do. |
| (3) | do | do | do | do | do | do | do | Do. |
| (4) | do | Excellent | Reduced gloss left circle | do | Little effect | do | do | Do. |
| Control (none) | Calf | | do | do | No effect | do | Slight stain | Do. |
| Johnson's white shoe polish | do | Poor | Slight circle | do | Removed polish | Removed polish | Stained | Removed polish. |
| Formulation: | | | | | | | | |
| (1) | do | Very good | Reduced gloss | do | No effect | Stained | No effect | No effect. |
| (2) | do | Good | No effect | do | Removed polish | do | do | Do. |
| (3) | do | do | do | do | do | do | do | Do. |
| (4) | do | Excellent | Reduced gloss | do | do | do | do | Do. |

SERIES D-2. TWO COATS OF FINISH-FILM AGED FOUR DAYS

| Treatment | Leather | Crock resistance | Ethanol solution | Acetic acid solution | Detergent solution | Mustard and ketchup | Coke, coffee citric acid | Oil stain |
|---|---|---|---|---|---|---|---|---|
| Control (none) | Fina | Very good | Slight circle | No effect | No effect | Slight stain | No effect | No effect. |
| Johnson's white shoe polish. | do | Fair | Slight circle gloss loss | do | Removed polish | Stained | Stained | Removed polish. |
| Formulation: | | | | | | | | |
| (1) | do | Excellent | Slight circle | do | Slight circle | do | No effect | No effect |
| (2) | do | Very good | Gloss loss | do | No effect | do | do | Do. |
| (3) | do | Fair | No effect | do | Slight circle | do | do | Do. |
| (4) | do | Excellent | Slight circle gloss loss | do | No effect | do | do | Do. |
| Control (none) | Calf | do | No effect | do | do | do | Slight stain | Do. |
| Johnson's white shoe polish. | do | Fair | Gloss loss | Removed polish. | Removed polish | do | Stained | Removed polish |
| Formulation: | | | | | | | | |
| (1) | do | Excellent | do | No effect | No effect | do | No effect | No effect. |
| (2) | do | Very good | No effect | do | Gloss loss | do | do | Do. |
| (3) | do | Fair | do | do | No effect | do | do | Do. |
| (4) | do | Excellent | Gloss loss | do | No effect | do | do | Do. |

SERIES D-3.—THREE COATS OF FINISH-FILM AGED ONE DAY

| Treatment | Leather | Crock resistance | Ethanol solution | Acetic acid solution | Detergent solution | Mustard and ketchup | Coke, coffee citric acid | Oil stain |
|---|---|---|---|---|---|---|---|---|
| Control (none) | Fina | Very good | No effect | No effect | No effect | Stained | No effect | No effect. |
| Johnson's white shoe polish. | do | Fair | do | do | Removed polish | do | Stained | Removed polish. |
| Formulation: | | | | | | | | |
| (1) | do | Excellent | do | do | No effect | do | No effect | No effect. |
| (2) | do | Very good | do | do | Gloss loss | do | do | Do. |
| (3) | do | Poor-fair | do | do | No effect | do | do | Do. |
| (4) | do | Excellent | do | do | Gloss loss | do | do | Do. |
| Control (none) | Calf | Very good | do | do | No effect | do | do | Do. |
| Johnson's white shoe polish. | do | Fair | do | do | Removed polish | do | Stained | Removed polish. |
| Formulation: | | | | | | | | |
| (1) | do | Excellent | do | do | No effect | do | do | No effect. |
| (2) | do | Very good | do | do | Gloss loss | do | do | Do. |
| (3) | do | Poor-fair | do | do | do | do | do | Do. |
| (4) | do | Excellent | do | do | No effect | do | do | Do. |

EXAMPLE 4

Two finish/polish formulations were prepared which contained the following ingredients. The first formulation contained 1273 g. of a 38 percent by weight aqueous emulsion of an emulsion polymerized silicone-acrylate copolymer which consists of about 30 percent by weight of a silicone which consists of 95 mol percent of dimethylsiloxane units and 5 mol percent of methylvinylsiloxane units and 70 percent by weight of an acrylate which consists of 60 percent by weight of ethyl acrylate and 37.1 percent by weight of methylmethacrylate and 2.9 percent by weight of methacrylic acid, 1776 g. of deionized water, 145.2 g. of ethylene glycol, 145.2 g. of the wax of example 3, 193.6 g. of the leveler of example 3, and 1306.5 g. of a 50 percent aqueous dispersion of titanium dioxide.

The second formulation was identical to the first except that it contained only 458.6 g. of water and in addition contained 797 g. of a 7.2 percent solids aqueous emulsion of an emulsion polymerized siloxane copolymer which consisted of about 29 mol percent trimethylsiloxane units and about 71 mol percent monomethylsiloxane units, and 520 g. of a 7.58 percent solids aqueous emulsion of an emulsion polymerized siloxane copolymer which consisted of about 33.3 mol percent trimethylsiloxane units and about 66.7 mol percent monomethylsiloxane units.

The formulations were evaluated on leather as finish/polishes employing the following tests.

Gloss

The Gardner portable 60° Glossmeter was used to measure the gloss after one coat, two coats, and three coats. A drying time of 24 hours was allowed between each coat. Two readings of the Glossmeter were taken and averaged.

Scuff Coverage And Scuff Resistance

Before the leather samples were coated with polish, a fairly severe scuff was made on one side of each sample by passing a metal spatula over the same area three times. On the opposite side of the leather a simulated heel mark was produced by passing a piece of black rubber over the same area three times. Scuff coverage was then judged after each coat of the finish/polish. Scuff resistance was judged after the third coat by pressing heavily the blunt end of a ballpoint pen over the surface. The amount of scuff or mar was rated.

Adhesion Test

This test was made by pressing firmly about 3 inches of Scotch tape on the leather surface after the third coat. The tape is gently removed and the amount of the finish/polish removed on the tape is noted. The results are rated from poor to excellent. If any of the finish/polish is removed exposing the naked leather surface, this is rated as poor. If none of the finish/polish is removed, this is rated as excellent. Varying amounts of removal of the finish/polish is rated as fair to good.

Crock Resistance

The crock test was carried out by the use of a Crockmeter. Green felt squares of about 3 cm. by 4 cm. are placed on the end of a lever arm which can be cranked back and forth to cover a path of about 5 inches. The felt squares are passed across the leather samples 20 times then removed and the amount of finish/polish rub off is rated from poor to excellent.

Dirt Test

The leather samples were placed in 8 ounce round bottles which contained about 45 g. of dirt. The bottles were then rolled for 15 minutes on a mechanical roller. The samples were then removed from the bottles and shaken off. The amount of dirt remaining on the surface is noted. The samples were then wiped with a damp cloth and further evaluated for appearance.

Water Spot Resistance

Five drops of distilled water were placed on each sample and allowed to stand for 5 minutes. At the end of this time, the water was blotted off. If no spot was left the results were rated as excellent; a slight spot was rated as good; a definite water spot but with no swelling was rated as fair; a definite water spot and with definite swelling was rated as poor; and if there is dye or color removal the rating of very poor was given

Stain Test

The leather samples are placed on a flat surface and one or two drops of test stain applied from an eyedropper held at a height of two to three inches above the leather. The test stain consists of a 1 percent solution of a purple-blue dye (Calco 2) in water. The stain is allowed to stand on the leather for 30 seconds and then removed with a cleansing tissue, blotter or sponge and the results immediately evaluated.

The results of the above described tests are set forth in the following table.

| Treatment | Leather | Scuff resistance | Scuff coverage | Crock resistance | Water spot resistance | Stain test | Adhesion test | Dirt test | Gloss Initial | One coat | Two coats | Three coats |
|---|---|---|---|---|---|---|---|---|---|---|---|---|
| (1) | Fina. | Good | Good | Very good | Excellent | Fair-good | Excellent | Good | 5 | 20 | 41 | 4 |
| (2) | do | do | Fair-good | do | do | do | do | Fair | 5 | 24 | 48 | 53 |
| (1) | Calf | do | Good | do | do | do | do | Good | 8 | 13 | 22 | 28 |
| (2) | do | Fair-good | do | Good | do | do | do | Fair | 8 | 14 | 23 | 31 |

EXAMPLE 5

Four finish/polish formulations were prepared which have the following composition. Formulation A contained 26.3 percent of an aqueous emulsion containing 38 percent of an emulsion polymerized silicone-acrylate copolymer which consisted of about 30 percent by weight of a silicone which consists of 95 mol percent of dimethylsiloxane units and 5 mol percent of methylvinylsiloxane units, and 70 percent by weight of an acrylate which consists of 60 percent by weight of ethyl acrylate and 37.1 percent by weight of methylmethacrylate and 2.9 percent by weight of methacrylic acid, 27.8 percent of an aqueous emulsion containing 7.2 percent solids of an emulsion polymerized siloxane copolymer which consists of about 29 mol percent trimethylsiloxane units and about 71 mol percent monomethylsiloxane units, 8.9 percent water, 3.0 percent ethylene glycol, 3.0 percent of the wax of example 3, 4.0 percent of the leveler of example 3 and 27.0 percent of a 50 percent aqueous dispersion of titanium dioxide.

Formulation B was identical to Formulation A except that it contained none of the siloxane copolymer and contained 36.7 percent water.

Formulation C was identical to Formulation A except that it only contained 18.4 percent of the silicone-acrylate copolymer emulsion and 16.8 percent of water.

Formulation D was identical to Formulation A except that it contained only 18.4 percent of the silicone-acrylate copolymer emulsion, contained none of the siloxane copolymer and contained 44.6 percent water.

These four finish/polish formulations were evaluated on leather and compared to Johnson's White Shoe Polish and the results of these evaluations are set forth in the table below. The test procedures used were the same as those described in example 4.

A.
- (1) 10% of a silicone-acrylate copolymer consisting essentially of about 30% of a silicone which consists essentially of about 95 mol percent dimethylsiloxane units and about 5 mol percent methylvinylsiloxane units and about 70% of an acrylate which consists essentially of about 60% ethyl acrylate, about 37% methylmethacrylate and about 3% methacrylic acid,
- (2) 1% tributoxyethylphosphate,
- (3) 3% glycol ether,
- (4) 15% titanium dioxide,
- (5) 0% wax, and
- (6) 71% water.

B.
- (1) 5% of a silicone-acrylate copolymer consisting essentially of about 20% of silicone which consists essentially of about 88 mol percent dimethylsiloxane units and about 12 mol percent methylvinylsiloxane units, and about 80% of an acrylate which consists essentially of about 58% ethyl acrylate, about 40% methylmethacrylate and about 2% acrylic acid,
- (2) 0.1% tributoxyethylphosphate,
- (3) 2% ethylene glycol,
- (4) 10% titanium dioxide,
- (5) 5% carnauba wax, and
- (6) 77.9% water.

- (1) 15% of a silicone-acrylate copolymer consisting essentially of about 50% of a silicone which consists essentially of about 97 mol percent dimethylsiloxane units and about 3 mol percent dimethylsiloxane units and about 3 mol percent dimethylvinylsiloxane units, and about 50% of an acrylate which consists essentially of about 62% ethyl acrylate, about 32% methylmethacrylate and 6% acrylonitrile,
- (2) 1.5% tributoxyethylphosphate,
- (3) 4.5% ethylene glycol,
- (4) 20% titanium dioxide,
- (5) 10% microcrystalline hydrocarbon wax, and
- (6) 49% water.

D.
- (1) 12% of a silicone-acrylate copolymer consisting essentially of about 35% of a silicone which consists essentially of about 92 mol percent dimethylsiloxane units and about 80mol percent methylvinylsiloxane units, and about 65% of an acrylate which consists of about 60% ethyl acrylate, about 35% methylmethacrylate and about 5% methacrylic acid,
- (2) 1.2% tributoxyethylphosphate,
- (3) 2.5% glycol ether,
- (4) 12.3% titanium dioxide.

| Treatment | Leather | Scuff coverage | Crock resistance | Stain test | Adhesion test | Dirt test | Gloss Initial | One coat | Two coats | Three coats |
|---|---|---|---|---|---|---|---|---|---|---|
| Johnson's white shoe polish | Fina. | Good | Poor | Poor | Poor | Poor | 5 | 7 | 5 | 5 |
| Formulation: | | | | | | | | | | |
| A | | do | do | Good | Fair-poor | Excellent | Fair | 5 | 31 | 55 | 57 |
| B | | do | do | Excellent | Fair | do | Good | 5 | 25 | 38 | 37 |
| C | | do | do | Good | Fair-poor | do | Poor | 4 | 25 | 38 | 42 |
| D | | do | Fair | do | do | Fair | Fair | 5 | 16 | 21 | 22 |
| Johnson's white shoe polish | Calf | Good | Poor-fair | Very poor | Poor-fair | Poor | 7 | 5 | 5 | 5 |
| Formulation: | | | | | | | | | | |
| A | | do | Fair-good | Fair-poor | Excellent | do | 6 | 18 | 32 | 39 |
| B | | do | do | Excellent | Fair | do | Good | 7 | 12 | 21 | 26 |
| C | | do | do | Good | Fair-poor | do | Poor | 7 | 20 | 26 | 32 |
| D | | do | Fair | do | do | Poor-fair | do | 7 | 16 | 20 | 25 |

EXAMPLE 6

When the following compositions are prepared in accordance with this invention good finish/polishes are obtained.

| | | |
|---|---|---|
| (5) | 4% | ozokerite wax. |
| (6) | 65% | water, and |
| (7) | 3% | of a siloxane copolymer which consists essentially of about 20 mol percent trimethylsiloxane units and about 80 mol percent monomethylsiloxane units. |
| E. (1) | 8% | of a silicone-acrylate copolymer consisting essentially of about 25% of a silicone which consists essentially of about 94 mol percent dimethylsiloxane units and about 6 mol percent methylvinylsiloxane units, and about 75% of an acrylate which consists of about 59% ethyl acrylate, about 37% methylmethacrylate and about 4% acrylic acid. |
| (2) | 0.5% | tributoxyethylphosphate, |
| (3) | 3% | ethylene glycol, |
| (4) | 14% | titanium dioxide, |
| (5) | 2% | carnauba wax, |
| (6) | 70.5% | water, and |
| (7) | 2% | of a siloxane copolymer which consists essentially of about 40 mol percent trimethylsiloxane units and 60 mol percent monomethylsiloxane units. |

That which is claimed is:

1. A finish/polish for white leather which is an aqueous emulsion of
   1. 5 to 15 percent by weight of a silicone-acrylate graft copolymer wherein the acrylic monomers are grafted onto an already formed siloxane polymer, said copolymer consisting essentially of 20 to 50 percent by weight of a silicone which consists of 88 to 97 mol percent of dimethylsiloxane units, and 3 to 12 percent of methylvinylsiloxane units, and 50 to 80 percent by weight of an acrylate which consists essentially of 58 to 62 percent by weight of ethyl acrylate, 32 to 40 percent by weight of methylmethacrylate and 2 to 6 percent by weight of a material selected from the group consisting of methacrylic acid, acrylic acid and acrylonitrile,
   2. 0.1 to 1.5 percent by weight of a leveling agent,
   3. 2 to 4.5 percent by weight of ethylene glycol or a glycol ether,
   2. 10 to 20 percent by weight of titanium dioxide,
   5. 0 to 10 percent by weight of a wax, and
   6. the balance water.

2. A finish/polish as defined in claim 1 which also contains from 1 to 3 percent by weight of a siloxane copolymer which consists essentially of 20 to 40 mol percent of trimethylsiloxane units and 60 to 80 mol percent of monomethylsiloxane units.

3. A finish/polish as defined in claim 1 wherein
   1. is 8 to 12 percent by weight of a silicone-acrylate graft copolymer wherein the acrylic monomers are grafted onto an already formed siloxane polymer, said copolymer consisting essentially of 25 to 35 percent by weight of a silicone which consists of 92 to 97 mol percent of dimethylsiloxane units and 3 to 8 mol percent methylvinylsiloxane units, and 65 to 75 percent by weight of an acrylate which consists essentially of 58 to 62 percent by weight of ethyl acrylate, 32 to 40 percent by weight of methylmethacrylate and 2 to 6 percent by weight of a material selected from the group consisting of methacrylic acid, acrylic acid and acrylonitrile,
   2. 0.5 to 1.2 percent by weight of a leveling agent,
   3. 2.5 to 3.5 percent by weight of ethylene glycol or a glycol ether,
   4. 10 to 15 percent by weight of titanium dioxide,
   5. 0 to 10 percent by weight of a wax, and
   6. the balance water.

4. A finish/polish as defined in claim 3 wherein (2) is tributoxyethylphosphate, (3) is ethylene glycol, and there is at least 1 percent by weight of wax (5).

5. A finish/polish as defined in claim 4 wherein the wax (5) is carnauba wax.

6. A finish/polish as defined in claim 3 which also contains from 1 to 3 percent by weight of a siloxane copolymer which consists essentially of 20 to 40 mol percent of trimethylsiloxane units and 60 to 80 mol percent of monomethylsiloxane units.

7. A finish/polish as defined in claim 4 which also contains from 1 to 3 percent by weight of a siloxane copolymer which consists essentially of 20 to 40 mol percent of trimethylsiloxane units and 60 to 80 mol percent of monomethylsiloxane units.

8. A finish/polish as defined in claim 5 which also contains from 1 to 3 percent by weight of a siloxane copolymer which consists essentially of 20 to 40 mol percent of trimethylsiloxane units and 60 to 80 mol percent of monomethylsiloxane units.

* * * * *